US011682003B2

(12) United States Patent
Gluck

(10) Patent No.: US 11,682,003 B2
(45) Date of Patent: Jun. 20, 2023

(54) SYSTEMS AND METHODS FOR CHARITABLE GIVING USING BLOCKCHAIN CRYPTOCURRENCY

(71) Applicant: Buytech Inc., Spring Valley, NY (US)

(72) Inventor: Avrohom Meir Gluck, Spring Valley, NY (US)

(73) Assignee: AVROHOM MEIR GLUCK, Spring Valley, NY (US)

( * ) Notice: Subject to any disclaimer, the term of this patent is extended or adjusted under 35 U.S.C. 154(b) by 415 days.

(21) Appl. No.: 16/657,438

(22) Filed: Oct. 18, 2019

(65) Prior Publication Data

US 2020/0134608 A1 Apr. 30, 2020

Related U.S. Application Data

(60) Provisional application No. 62/749,770, filed on Oct. 24, 2018.

(51) Int. Cl.
*G06Q 20/36* (2012.01)
*G06Q 20/06* (2012.01)
(Continued)

(52) U.S. Cl.
CPC ..... *G06Q 20/3678* (2013.01); *G06Q 20/0655* (2013.01); *G06Q 30/0279* (2013.01); *H04L 9/0637* (2013.01)

(58) Field of Classification Search
CPC ........... G06Q 20/3678; G06Q 20/0655; G06Q 30/0279; G06Q 2220/00; G06Q 20/065;
(Continued)

(56) References Cited

U.S. PATENT DOCUMENTS

2015/0228022 A1* 8/2015 Brown ................... G06Q 40/04
705/37

OTHER PUBLICATIONS

Jain et al., Blockchain for the Common Good: A digital Currency for Citizen Philanthropy and Social Entrepreneurship, Jul. 1, 2018, 2018 IEEE International Conference on (iThings) and (GreenCom) and (CPSCom) and (SmartData), pp. 1387-1394 (Year: 2018).*
(Continued)

*Primary Examiner* — John W Hayes
*Assistant Examiner* — Yingying Zhou
(74) *Attorney, Agent, or Firm* — Torchman IP; Jonathan Torchman

(57) ABSTRACT

Systems and methods for storing and managing blockchain transactions may include receiving a transaction request on a distributed ledger transaction machine that is part of a distributed ledger network including distributed ledger transaction machines, each storing an identical copy of a blockchain. The method may include extracting percentage allocations for each transaction in the transaction request as well as a set of identifying information indicating a charitable owner for at least one of the transactions. The method may further include recording a first transaction in a block on the distributed ledger transaction machine, which can be freely exchanged and transferred on the distributed ledger network and is unmarked, and a second transaction on the block on the distributed ledger transaction machine, including restricting the second transaction via a marking in the second transaction's data where the marking enables a centralized machine to control access and use of the second transaction.

15 Claims, 9 Drawing Sheets

(51) Int. Cl.
*G06Q 30/0279* (2023.01)
*H04L 9/06* (2006.01)
(58) Field of Classification Search
CPC ............ G06Q 20/389; G06Q 20/40145; H04L 9/0637; H04L 9/3239; H04L 63/12; H04L 2209/38; H04L 2209/56
See application file for complete search history.

(56) References Cited

OTHER PUBLICATIONS

Andreas M. Antonopoulos, Mastering Bitcoin, Dec. 2014, O'Reilly, 1st Edition, chapters 2 and 5. (Year: 2014).*

* cited by examiner

SYSTEMS AND METHODS FOR CHARITABLE GIVING USING BLOCKCHAIN CRYPTOCURRENCY

CROSS-REFERENCE TO RELATED APPLICATIONS

This application claims the benefit of U.S. Provisional Application No. 62/749,770 filed on Oct. 24, 2018, the contents of which are hereby incorporated by reference.

TECHNICAL FIELD

The present disclosure relates generally to server technologies and more particularly to blockchain server systems.

BACKGROUND

Blockchain technologies are advancing so that people can maintain wallets with various transactions logged on one or more distributed blockchain ledgers. Individuals can convert, trade, buy and sell on cryptocurrency exchanges, like regular exchanges with varied levels of tax effects. Transactions may include one or more transfers of value between cryptocurrency wallets where the transfers are also included or recorded on the blockchain. Transactions are then broadcast to the distributed ledger network, confirmed and recorded on all the nodes. Blocks are then confirmed so as to be immutable on the distributed ledger once recorded.

There is a growing interest for charitable giving in cryptocurrencies utilizing blockchain technologies and distributed ledgers. Charitable givers today cannot efficiently or effectively give directly to organizations using cryptocurrency without the giver or recipient exchanging first into fiat currency. Cashing out of cryptocurrencies has unnecessary technical difficulties as well as financial and tax consequences, all of which limit the charitable givers' options. Further, there is no secure and efficient method of managing and storing transactions according to a third-party entity such as a non-profit or a charitable trust/foundation.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a system and method including receiving a transaction request on a first distributed ledger transaction machine of a plurality of distributed ledger transaction machines, which are part of a distributed ledger network, each storing an identical copy of a blockchain. The method may include extracting percentage allocations for each transaction in the transaction request as well as a set of identifying information indicating a charitable owner for at least one of the transactions. Further the method may include recording a first transaction extracted from the transaction request in a block on the blockchain, on the first distributed ledger transaction machine according to a first percentage allocation from the extracted percentage allocations, where the first transaction can be freely exchanged and transferred on the distributed ledger network and is unmarked and recording a second transaction on the block on the first distributed ledger transaction machine according to a second percentage allocation from the extracted percentage allocations, including restricting the second transaction via a marking in the second transaction's data where the marking enables a centralized machine to control access and use of the second transaction, which is not controlled by the distributed ledger network. Finally, the method may include transmitting an identifier for the second transaction to the centralized machine for storage and management.

Certain embodiments disclosed herein also include systems and methods including receiving a request on a centralized machine to release a marked transaction which is recorded on a distributed ledger network comprising distributed ledger transaction machines each storing an identical copy of a blockchain distributed ledger, wherein the centralized machine controls access and use of the markings. The methods may further include identifying the marked transaction on a data structure local to the centralized machine, wherein the data structure is used for controlling the access and use of the markings, and updating the local data structure to indicate release of the marked transaction. Finally, the methods may include transmitting a new transaction to the distributed ledger network for recording and adding to the blockchain distributed ledger as indication of the release.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
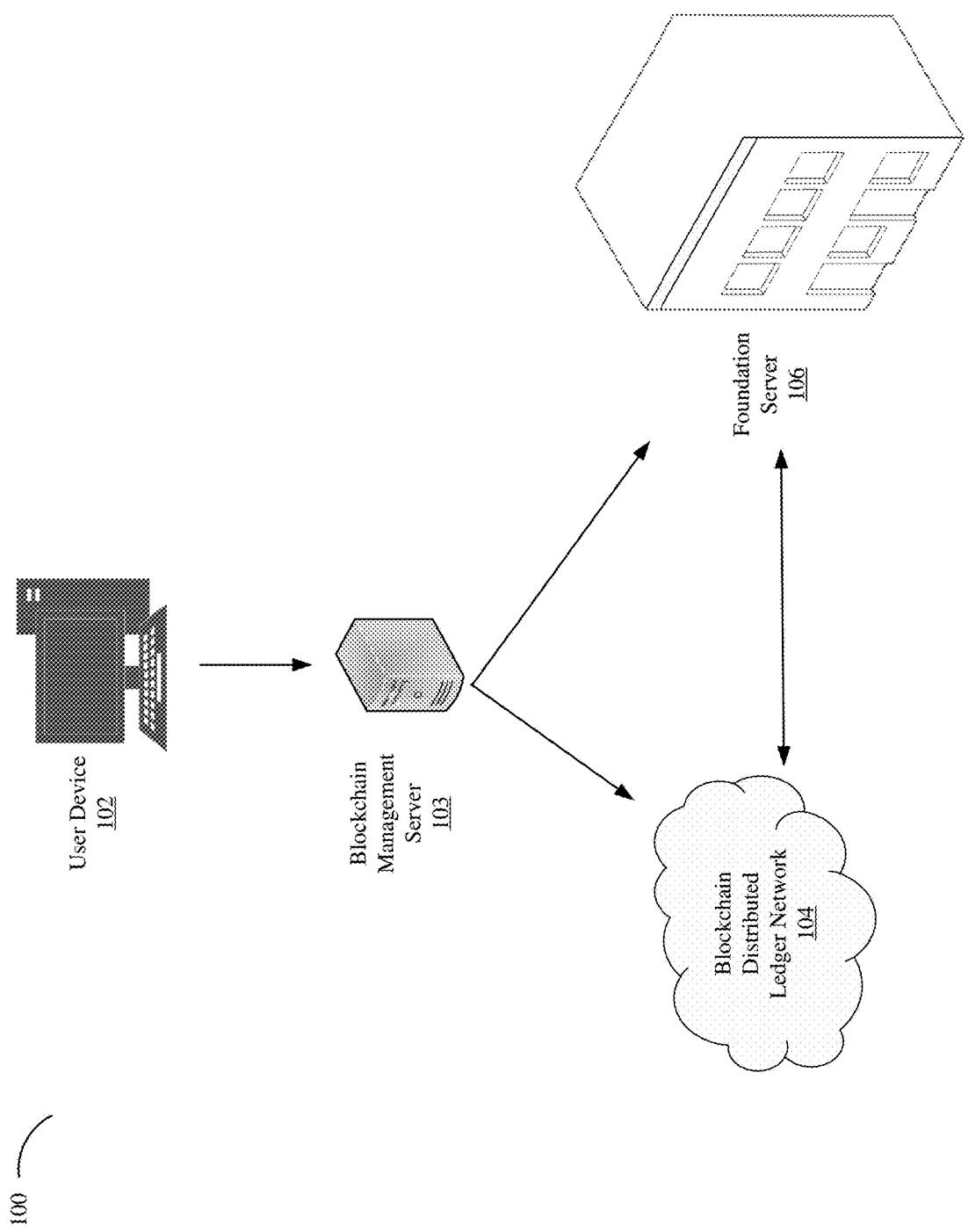
FIG. 1 illustrates an exemplary system architecture for a charitable giving system using blockchain technologies.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Embodiments of the present inventive concept include hybrid methods and systems of cryptocurrency, which fulfills existing needs of donors and individuals. Embodiments enable securing and more efficiently managing charitable contributions and/or splitting transactions. Embodiments include innovations in blockchain and cryptocurrency technologies. Some embodiments may include non-hybrid, and/or hybrid cryptocurrency systems including two ownership components—a primary owner, and a shared owner such as a charitable institution, foundation, or central manager. Any other shared or secondary owner may also be considered such as a friend, a family member, a creditor, etc. For example, an owner may want to share with their family when acquiring cryptocurrency in an automatic and seamless fashion. Some embodiments include two architectural components—one which is wholly decentralized and one which is at least partially centralized.

The partially centralized, and partially decentralized portions may correlate to two or more seemingly parallel while jointly connected markets. For example, the blockchain distributed ledger network may be a primary exchange or marketplace where cryptocurrencies are bought and sold regularly while being stored on an immutable distributed ledger. This is effectively a first exchange or marketplace. At the same time, the foundation server's centralized database and/or blockchain(s) may be a secondary marketplace with a different set of governing rules, timing, and therefore valuation of coins or cryptocurrencies at any given time.

In some embodiments, a primary owner's portion of a coin may function similarly to existing system architectures such as Bitcoin. The primary owner's portion may be both decentralized, and privately owned and managed by an anonymous wallet. In further embodiments, a shared portion of the coin may be very different than existing architectures such as Bitcoin's. The shared portion of the coin may have a centralized redemption requirement process to ensure that only the true intended charitable recipient be the beneficiary of the coin and to control distribution aspects and/or restrictions, such as not to be distributed prior to a specific date or not after specific date, etc. This system improvement provides additional protection for the charitable owner and retains certain controls for the donor.

In further embodiments, the central manager may enact one or more data structures to lock, unlock and release one or more coins for distribution. For example, the central manager may have one or more access control lists. The list may be a database, an array, a linked list, a record, a graph, a binary tree, etc. In other examples, the manager may have one or more secondary blockchains which store, aggregate, identify and update the transactions that are to be released. In another embodiment, the manager may have a release list which stores all the transactions that are unlocked or released as well as the transactions which are locked. The release list may have information such as who the owner or designated recipient of the transaction is which may include identifying information, for example, such as that in FIG. 3.

FIG. 1 illustrates an exemplary system architecture 100 for a hybrid system using blockchain technologies. System architecture 100 may include one or more user devices 102, a blockchain management server 103, a blockchain distributed ledger network (BDLN) 104, and a foundation server 106. User device 102 may include one or more computers, tablets, notebooks, mobile phones, etc. which perform one or more transactions on BDLN 104. User device 102 may also include one or more computers, tablets, notebooks, mobile phones, etc. which execute a mining search and discovery on BDLN 104.

Blockchain management server 103 may manage requests by user device 102 to mine or purchase coins/transactions on BDLN 104 and/or foundation server 106. For example, blockchain management server 103 may be a device that enables users to make transactions that are automatically split between a distributed network and a centralized network. In some embodiments, blockchain management server 103 may be provided as an application on user device 102 or a set of Application Programming Interfaces (API) that allow automatically split transactions to occur on a system in BDLN 104.

BDLN 104 may include one or more blockchain distributed network devices or machines providing access and capabilities for people to store transactions, buy, sell and mine digital coins etc. BDLN 104 may include several networked computers each storing the one or more transactions using an identical copy of the blockchain as on the other computers networked in the BDLN 104. BDLN 104 may provide decentralized service so that system redundancy and security is provided via a distributed network as known in the art.

Foundation server 106 may include one or more locations and systems which manage a centralized blockchain, separate from the blockchain on the BDLN 104. In some embodiments, a mining transaction performed on user device 102 may be split automatically into 2 transactions where X percentage is allocated to be stored in one transaction on BDLN 104, and 1-X percentage (the remainder) is stored in a second transaction as marked or restricted on BDLN 104 and communicated to foundation server 106. In some embodiments, foundation server 106 may manage the marked transaction centrally, restricting control.

In some embodiments, a user may make a purchase on a blockchain distributed ledger (BDL) which gets automatically split to two or more transactions. For example, a network may be provided which allocates charity donations managed by foundation server 106 so that a user can provide automatic charity or non-profit allocations for each of their transactions.

Figure 2:
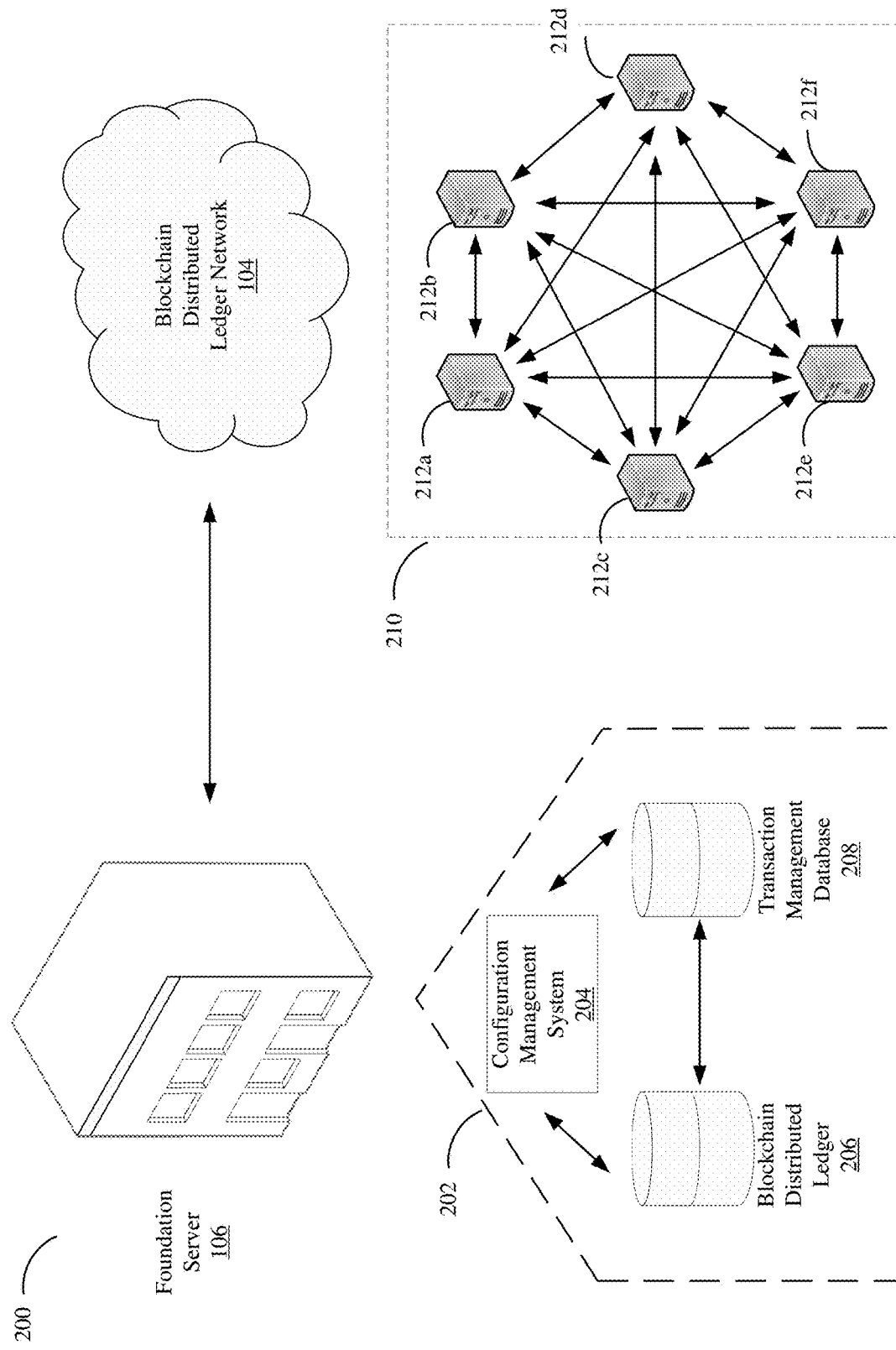
FIG. 2 illustrates a detailed exemplary charitable giving system using blockchain technologies.

FIG. 2 illustrates an exemplary detailed hybrid system architecture 200 using blockchain technologies. Detailed hybrid system architecture 200 may include foundation server 106, and blockchain distributed ledger network (BDLN) 104 in communication with each other via one or more networks. Foundation server 106 and BDLN 104 may communicate via TCP/IP, internet, telecommunications systems such as LTE, 4G or 5G, etc.

Foundation server 106 may contain managed system 202, including configuration management system 204, blockchain distributed ledger (BDL) 206, and transaction management database 208. The configuration management system 204 may receive, update, modify, restrict, and release various transactions on the BDL 206 and/or transaction management database 208. For example, configuration management system 204 may manage a blockchain stored in transaction management database 208, which is used to configure the access and release of transactions on the BDL 206. In another example, configuration management system 204 may create and update one or more release lists and store them in transaction management database 208. In yet another embodiment, the configuration management system 204 may create an access control list on transaction management database 208. The access control list may include all of the coins on BDL 206 which are released for access outside of the foundation server 106.

BDLN 104 may include distributed network 210 which may contain one or more terminals 212a-212f. Distributed network 210 illustrates an exemplary distributed system where the same blockchain may be copied identically onto all of terminals 212a-212e as known in current blockchain distributed systems. Distributed network 210 is an example of a network where all of the terminals are connected and can communicate with each other. Other network distributions and topologies are also possible including ring, mesh, star, line, fully connected, etc. The communication among terminals 212a-212e may be via a TCP/IP network, a telephony network, or within the same data center, for example.

Figure 3:
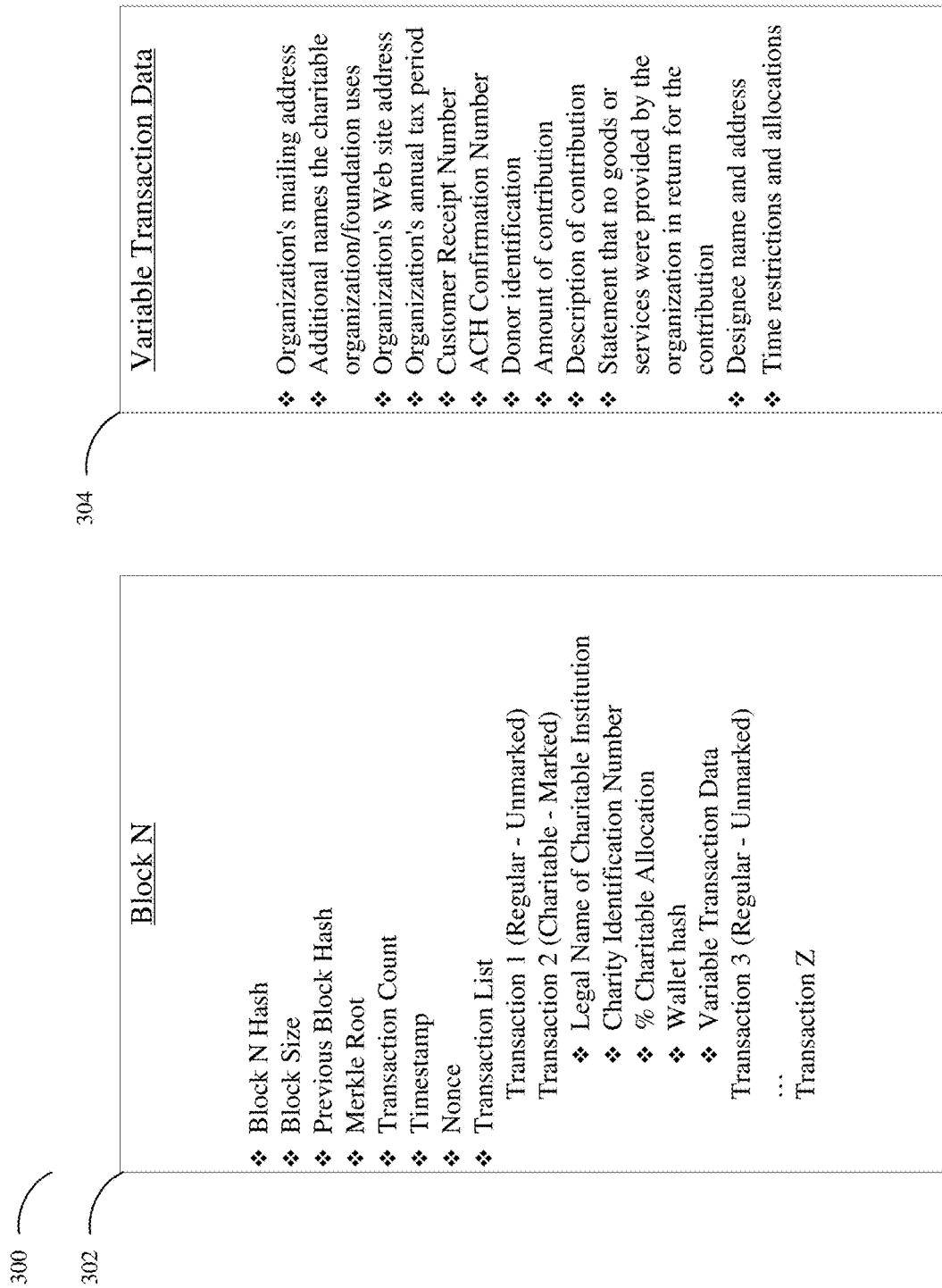
FIG. 3 illustrates exemplary blockchain data and variable transaction data.

FIG. 3 illustrates exemplary blockchain data 300. Blockchain data 300 may include block N 302 with all or part of variable transaction data 304. Block N 302 is a block example that may contain all or part of block 702's data in addition to that illustrated in exemplary blockchain data 300. For example, block N 302 may include the hash for Block N as well as Block N's size. Block N 302 may include the hash to the previous block, the Merkle root of the blockchain, the transaction count of the present block, a timestamp, a nonce and the transaction list. In some embodiments the transaction list may include non-restricted as well as restricted transactions. For example, as illustrated transaction 1 and transaction 3 may be unrestricted transactions. Similarly, transaction 2, as illustrated may be a marked restricted transaction.

In some embodiments, the restricted transactions may include one or more of several identifying data and metadata stored to indicate the correct ownership for access, control and management privileges. For example, the marked or restricted transaction may have the legal name of the charitable institution for which the transaction was intended. This may come from the mining transaction or original transaction discussed above. The miner may indicate the information present or illustrated in FIG. 3. The miner may indicate a charity identification number (such as a tax ID), a percentage allocated of the original transaction to this token or coin. A wallet hash may also be stored to identify the exact transaction that will be freed, or updated to be unrestricted according to the methods discussed herein.

In addition to the data identified in block N 302, any or all of the data in block 304 may also be used. For example, the indicated organizations accurate business mailing address may be added as a marked identifier. Additional names the institution, foundation, charitable or non-profit institution use may also be added for accurate identification and record keeping. The institution's web address may be added to the transaction list. For tax purposes, the institution's annual tax period may be stored so as to be identified relative to when the initial and/or release transaction(s) take place. The user may have a customer receipt number if there are any tax savings for deductions on personal income tax.

Additionally, the transaction may have an Automated Clearing House (ACH) confirmation number for when the transaction takes place. The user or donor who allocates a percentage of their token to the non-profit or charitable institution may also have their name or identification stored to preserve Know Your Customer principles well known in the art. The total amount of the allocation (among all transactions) and a description of the contribution may also be stored for the institution and the user's record keeping. A personal designee name and/or other identifying information may also be indicated. For example, a creditor or family member may be specified and their wallet hash or other secure identifying information. Similarly, one or more time indications may be added and managed centrally by foundation server 106.

In some embodiments the charitable or foundation component may be time activated. For example, a user may indicate when or how to allocate the centralized, foundation portion when they activate the transaction. For example, Karen may divest $4,000 to a charitable organization on Jan. 1, 2025 designating 10% to be restricted access to the United Way. The foundation server may be instructed to transfer $1,000 to the United Way each successive January $1^{st}$ (or another date) for the next four years, thus presenting a scripted time component managed by foundation server 106. In another example, Sam acquires 40,000 coins on the exchange specifying 10% for the Metropolitan Museum of Art and 10% for the American Red Cross. Sam may specify a time restriction indicating 500 coins to be released to the Metropolitan Museum of Art on a semi-annul or biyearly basis until the fund is depleted. The American Red Cross may have a separate allocation such as 1,000 coins initially released and then 500 coins on a scheduled release as described above.

Figure 4:
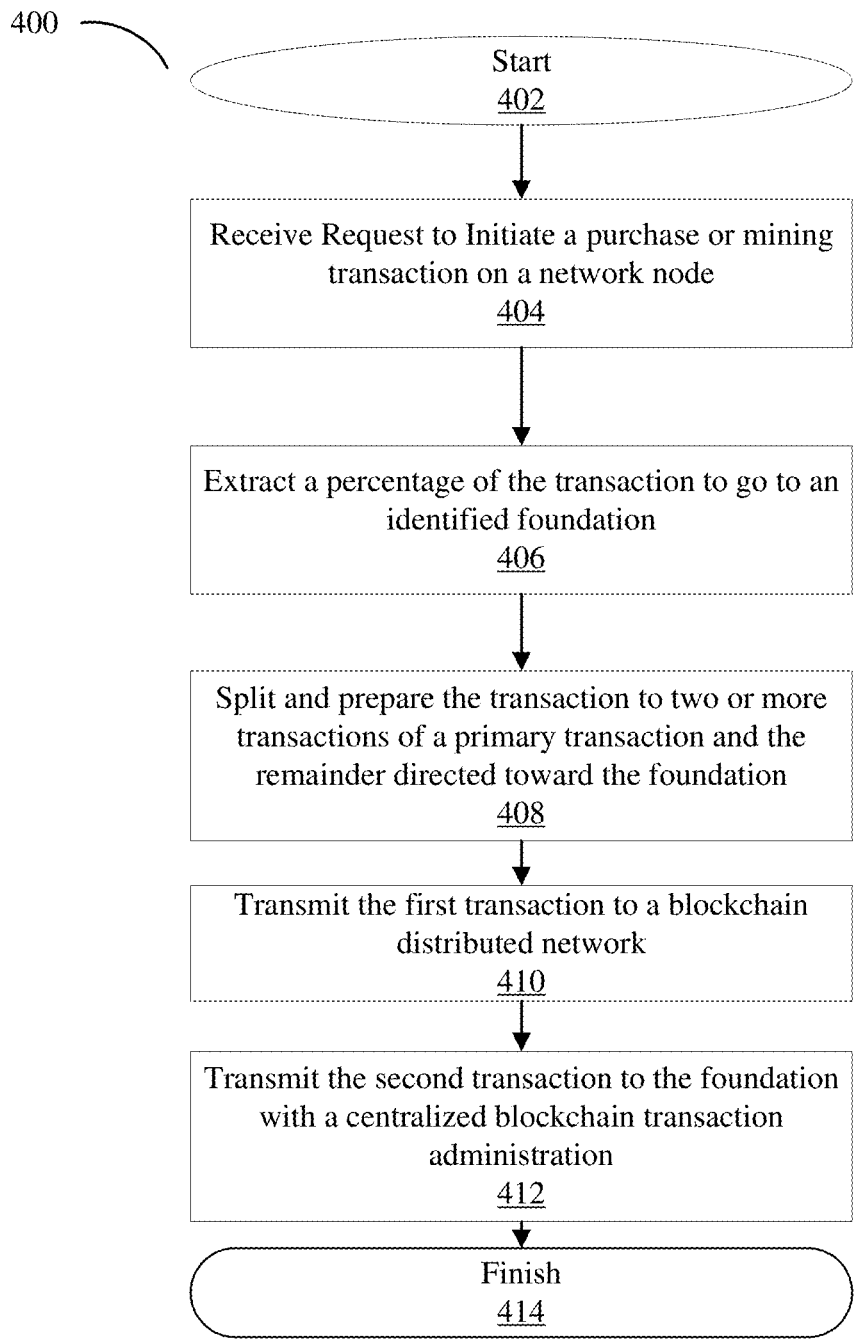
FIG. 4 illustrates a flow chart of a coin acquisition and/or transaction initiation.

FIG. 4 illustrates a flow chart of process 400 of coin acquisition and/or transaction initiation. Blockchain management server 103 may perform one or more of the steps in process 400. As mentioned above, blockchain management server 103 may be an application on user device 102, a standalone server or system or part of foundation server 106. Blockchain management server 103 may start at step 402 and proceed to step 404.

In step 404 blockchain management server 103 may receive a request from user device 102. The request may be an attempt to mine a transaction in some embodiments. In other embodiments, the request may be to execute a transaction. The blockchain management server 103 may proceed to step 406.

In step 406 blockchain management server 103 may extract a percentage allocation identified for one or more foundations. For example, the miner may indicate that 10% or 20% should go to a charity. Other identifying information as illustrated in FIG. 3 may be included in the request. Blockchain management server 103 may proceed to step 408.

In step 408 blockchain management server 103 may split the transaction into two and prepare to send the primary transaction to a decentralized system such as BDLN 104 and the foundation indicated portion to a centralized system such as foundation server 106. In some cases, blockchain management server 103 may be the same or part of foundation server 106. Blockchain management server 103 may prepare the transactions via reading any of the data specific to the identified charity or non-profit organization, for example. Blockchain management server 103 may proceed to step 410.

In step 410, blockchain management server 103 may provide the primary part of the transaction to a distributed network which may log it onto the blockchain successively at each of several nodes of the network identically. Blockchain management server 103 may proceed to step 412.

In step 412, blockchain management server 103 may provide the remainder or secondary portion of the transaction to foundation server 106. Foundation server 106 may log the transaction and restrict access as supervised by the foundation server 106. Blockchain management server 103 may proceed to step 414 or return again to step 402.

Figure 5:
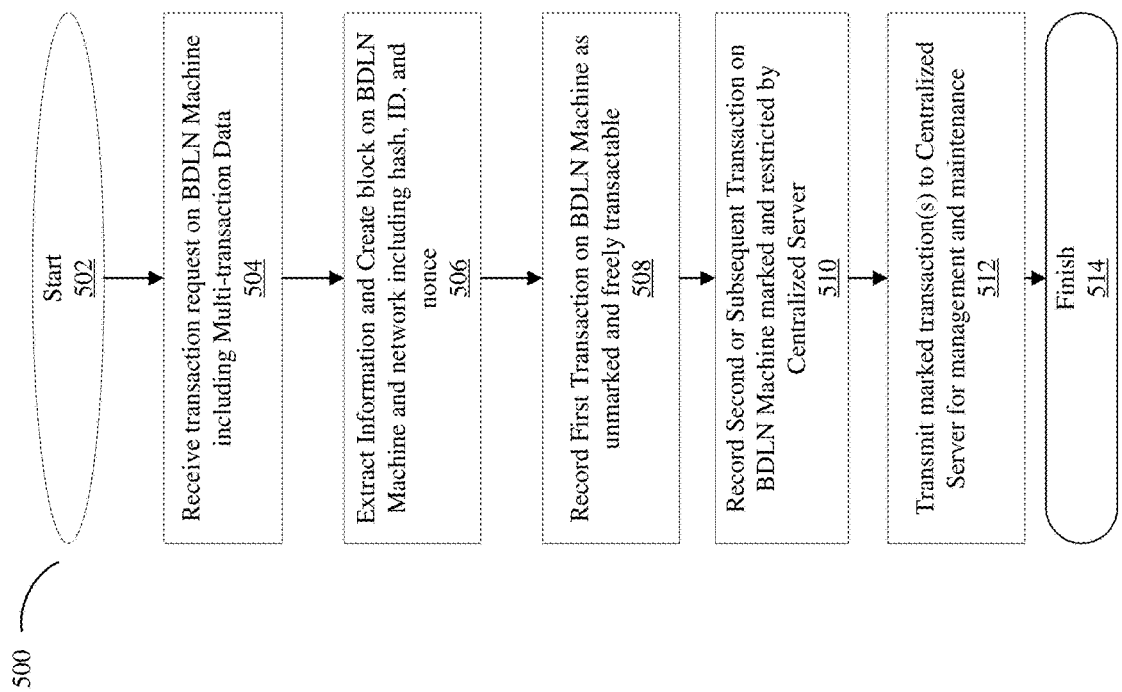
FIG. 5 illustrates a flow chart of a split transaction initiation and recording.

FIG. 5 illustrates a flow chart of process 500 of splitting a transaction initiation and recording. A distributed machine on blockchain distributed ledger network 104 and/or blockchain management server 103 may perform one or more of the steps in process 500. The distributed machine may start at step 502 and proceed to step 504.

In step 504 the distributed machine may receive one or more transactions on the BDLN 104. The transactions received may include a primary transaction and a secondary transaction which includes the remaining percentage of the primary transaction. The secondary transaction may include additional information such as a charitable owner or foundation designation. Additional information may be included as described with respect to FIG. 3.

In some embodiments, the request may include time restrictions and/or allocations for a distribution to one or more charitable institutions, individuals or organizations. Similarly, in the case of a charitable institution or non-profit, the organization's legal name, employer (tax) Identification and description of the donation may be supplied to be later stored on foundation server 106. In another example, a family member, private individual, creditor, etc. may be specified along with a percentage indication for a portion of the transaction to be attributed to. The distributed machine may proceed to step 506.

In step 506 the distributed machine may extract information from the received transactions and create a block which includes data such as the block hash or ID, nonce, and pointer to previous block. The extraction of data may include retrieving one or more charitable owners as designated by the miner or initiator of the transaction. Further, the percentage allocations for each of the transactions may be retrieved. Any number of transactions and/or charitable institutions may be identified. Extracting information may occur according to an algorithm, a script, or via a Representational state transfer (REST) API. The distributed machine may proceed to step 508.

In step 508 the distributed machine may record a first transaction as unmarked and freely transferable. The first transaction may be the majority of the wallet. The transaction may have no limitations or identifiable restrictions as compared with the marked transactions. The transaction may be recorded in the block created in step 506. In step 508, several transactions may be recorded, not just 1. The "first" transaction as indicated here, may be more than one transaction, where each of the transactions are considered unmarked or unrestricted. For example, a user may split their transaction to three transactions where the first two are unmarked, and the third is managed according to step 510. The distributed machine may proceed to step 510.

In step 510 the distributed machine may record a second or subsequent transaction as marked and restricted. The restriction may be controlled by a centralized server such as foundation server 106. In order to mark the transaction a data field may be entered for the transaction. In another embodiment, a read or write permission may be created and restricted to only certain devices, for example using an IP address or hash identifier. The marking may enable a foundation server 106 to control access and/or use of the marked transaction. The distributed machine may proceed to step 512.

In step 512 the distributed machine may transmit the second (or subsequent), marked transaction to the foundation server 106 for management and maintenance purposes. The distributed machine may transmit the hash of the transaction to a designated machine such as foundation server 106. The distributed machine may transmit any other identifier known in the art to distinguish a transaction on the distributed ledger. The distributed machine may proceed to step 514. In step 514 the distributed machine may finish or proceed to step 502 for the next transaction initiation and recording.

Figure 6:
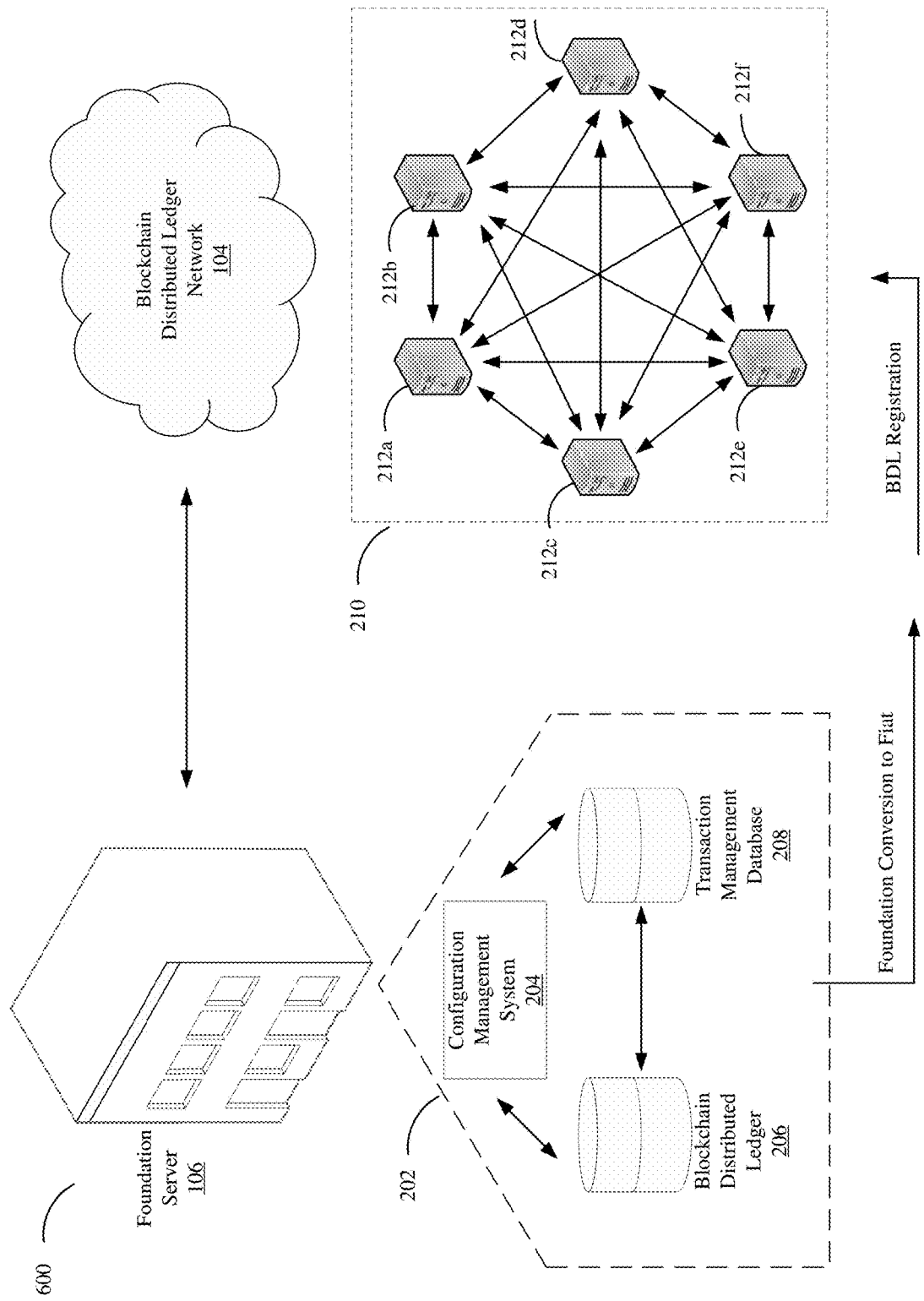
FIG. 6 is an exemplary system diagram of a currency conversion transaction.

FIG. 6 is an exemplary system diagram of a currency conversion transaction 600. Currency conversion transaction 600 may occur when the foundation server 106 determines that tokens or part of coins which are allocated and dedicated to registered charities, companies, non-profits, or individuals should be released from the foundation server 106 supervision. The foundation server 106, via the configuration management system 204 may identify which transactions should be released. For example, a charity or identified individual may submit a release request which notifies the configuration management system 204 that it wants to release or convert all or part of their coins into fiat currency. Configuration management system 204 may then add a transaction to blockchain distributed ledger 206 indicating that the indicated tokens should be released. Additionally, configuration management system 204 may update transaction management database 208 with a release or conversion allocation.

In some embodiments, as identified in FIG. 6, managed system 202 may provide the coins or tokens as unrestricted coins on BDLN 104. For example, the configuration management system 204 may transmit a new transaction onto BDLN 104 by conversion of the restricted token, coin or transaction to an unrestricted transaction.

Figure 7:
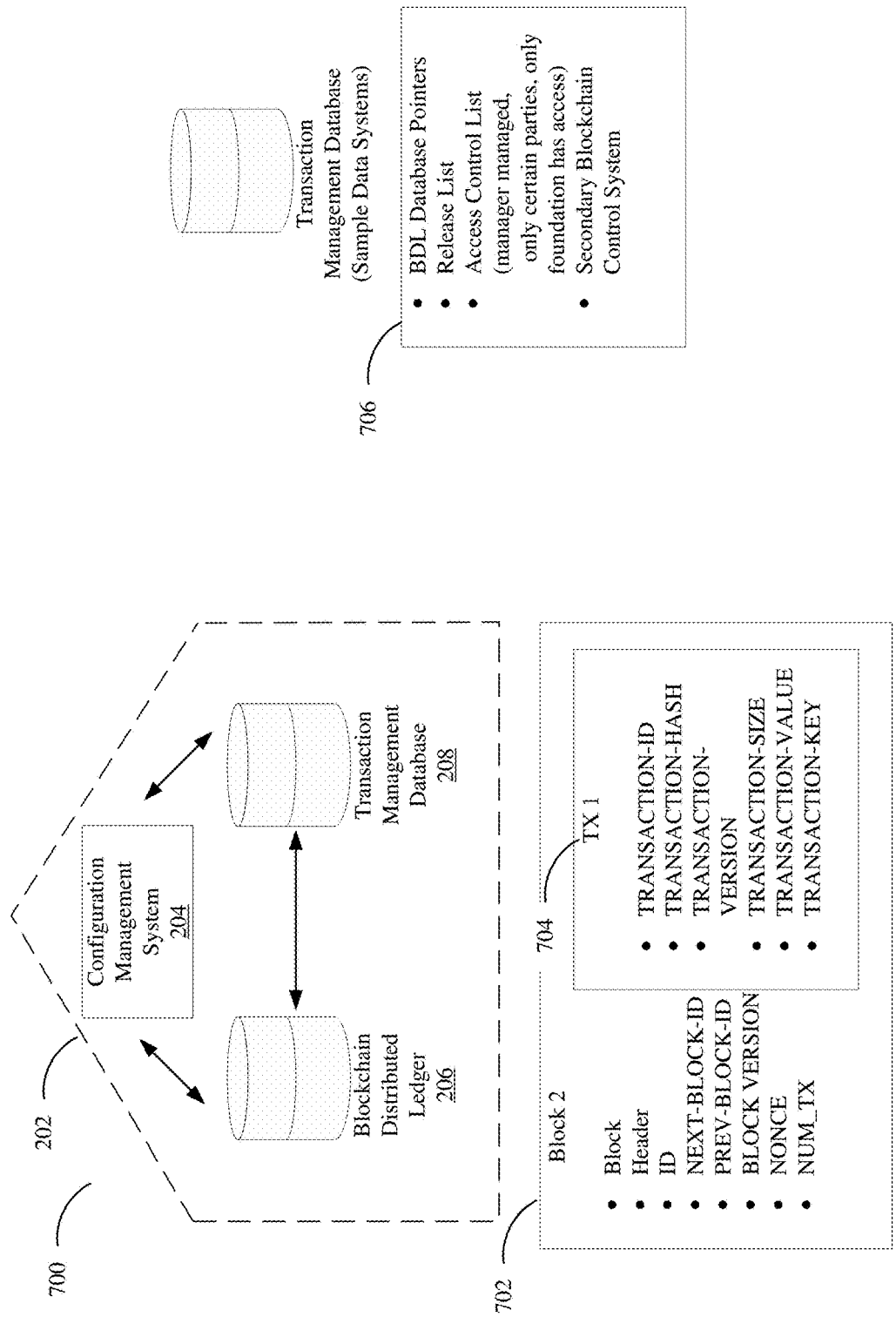
FIG. 7 illustrates an exemplary blockchain charitable management system.

FIG. 7 illustrates an exemplary blockchain foundation management system 700. Foundation management system 700 may include one or more blocks such as block 702 and one or more transaction databases such as transaction management database 706. Block 702 may also include any number of transactions such as exemplary transaction 704. Block 702 may be part of one or more centralized blockchains stored in blockchain distributed ledger 206 on foundation server 106. Block 702 may include, for example, a block number, header, block Identification (ID), a next block ID, a previous block ID, a block version, a nonce, and an indicator of the number of transactions on the block.

Transaction 704 illustrates an exemplary transaction which is one of many possible formats along with varying information for transactions stored in blockchain distributed ledger 206. Block 704 may include, for example, an identifier for the transaction or transaction ID. Block 704 may also include a transaction hash, a transaction version, a transaction size, a transaction value and a transaction key. Additional detailed examples of data and metadata present in blocks on blockchain distributed ledger 206 are included and discussed further above in FIG. 3 and can be used with exemplary transaction 704.

Transaction management database 706 may include one or more data structures that can be used to interact with the blockchain distributed ledger 206 and to enable restriction and derestriction of transactions on the centralized blockchain. In one example, transaction management database 706 may have one or more release lists. The release list may serve to indicate which transactions or coins are freed from the centralized management and are open for access. For example, derestricted coins may be added to the release list with their transaction ID, block number, etc. when the configuration management system 204 indicates they should be released (such as when requested by an authorized user).

In another example, transaction management database 706 may be used to store a secondary blockchain which records the appropriate transactions or coins which are to be released. For example, the configuration management system 204 may initialize the secondary blockchain or secondary blockchain control system when a restricted transaction is requested to be released. In another example, a block's transaction(s) may be identified and/or added to the secondary blockchain control system (which is then immutable) when one or more transactions or coins are indicated to be freed from restriction.

In another example, transaction management database 706 may contain one or more access control lists on the transaction management database 706. The access control list, for example, may have an indicator for each transaction whether or not the transaction or coin(s) should be accessed by the foundation manager, a specified third party, and/or the general public.

Figure 8:
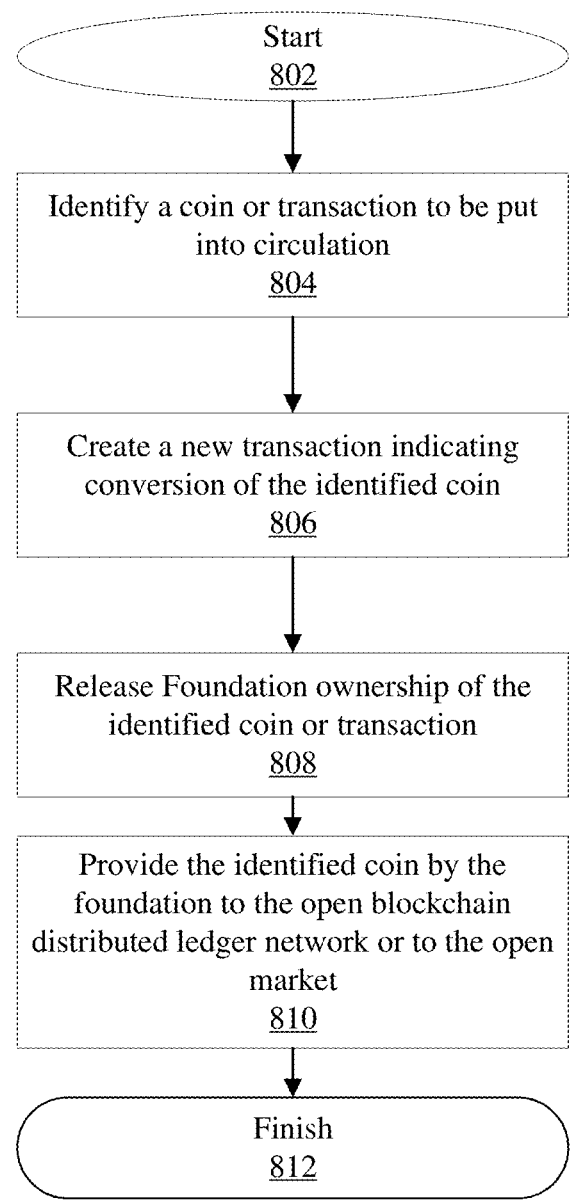
FIG. 8 includes a flowchart of an exemplary divestment in a charitable managed system.

FIG. 8 includes a flowchart of an example divestment 800 from a foundation managed system.

In some embodiments, foundation server 106 may begin at step 802 and proceed to step 804. In step 804, foundation server 106 may receive a request to release one or more transactions associated with an institution. In another embodiment, foundation server 106 may initiate a release of a coin or transaction(s) on its own via a configuration manager. Foundation server 106 may proceed to step 806.

In step 806, foundation server 106 may create one or more transactions or add to data structures to identify coins or transactions which should be released. In various embodiments, a secondary blockchain may be created or maintained for coin release. In another embodiment, a table or release list may be created and maintained for indicating which transactions should be released and where they should be released to. In another embodiment, an access control list may be modified indicating what privileges should be granted or changed for one or more transactions in the blockchain distributed ledger 206.

In an example, a new or secondary blockchain may be created which identifies a list of specific transactions to be released. For example, the transaction(s) ID or organization name may be used to indicate the transactions to be released.

In another example, a release list may be created. The release list may include a table or database entry for each transaction or for each institution. In one example, the release list may add a transaction with an ID or hash 00000000000000000004d898102371f1ed4581a389243d6-1277b4afd08a8c5b0. The transaction may have an associated Merkle Root 0d448892e5b0f2303250560c4745d-ca01c147eb196ebdf1158403c12e6d75c63. The listed transaction may be added to a list of "released" coins or transactions. The release list may similarly contain restricted coins or transactions. In some embodiments, the transaction may be moved from the restricted list to the "released" list. In other words, the entry in the restricted list may be removed while added in the "released" list.

In another example, one or more access control lists may be created to identify and manage all of the transactions on blockchain distributed ledger 206. For example, read, write, and restrict controls may be enabled on a per user, user group or institution basis. Each user may have different privileges. Therefore, the transaction management database 208 and blockchain distributed ledger 206 may communicate with each other for privileges and for marking each transaction as accessible or restricted for different users.

Foundation server 106 may proceed to step 808. In step 808, foundation server 106 may update one of the exemplary mentioned data structures to release ownership of one or more transactions. The release list may be updated, for example. In another example, the new transaction may be stored on the secondary blockchain. Foundation server 106 may proceed to step 810.

In step 810, foundation management system 204 may transmit the derestricted coin or transaction(s) to the distributed ledger or as currency. For example, configuration management system 204 may notify the BLDN 104 that one or more transactions have been derestricted. In one example, configuration management system 204 may traverse the secondary blockchain, identify that one or more relevant transactions have been released, and then transmit a TCP/IP packet to the BDLN 104 adding the derestricted transactions to the distributed ledger network. In another example, the transactions that have been derestricted on the foundation server 106 may be converted to fiat currency. The fiat may be withdrawn via an exchange, a bank, and/or withdrawn in cash.

The foundation management system 204 may proceed to step 812 and/or return to step 802 when it receives a new request to derestrict or recirculate a transaction.

Figure 9:
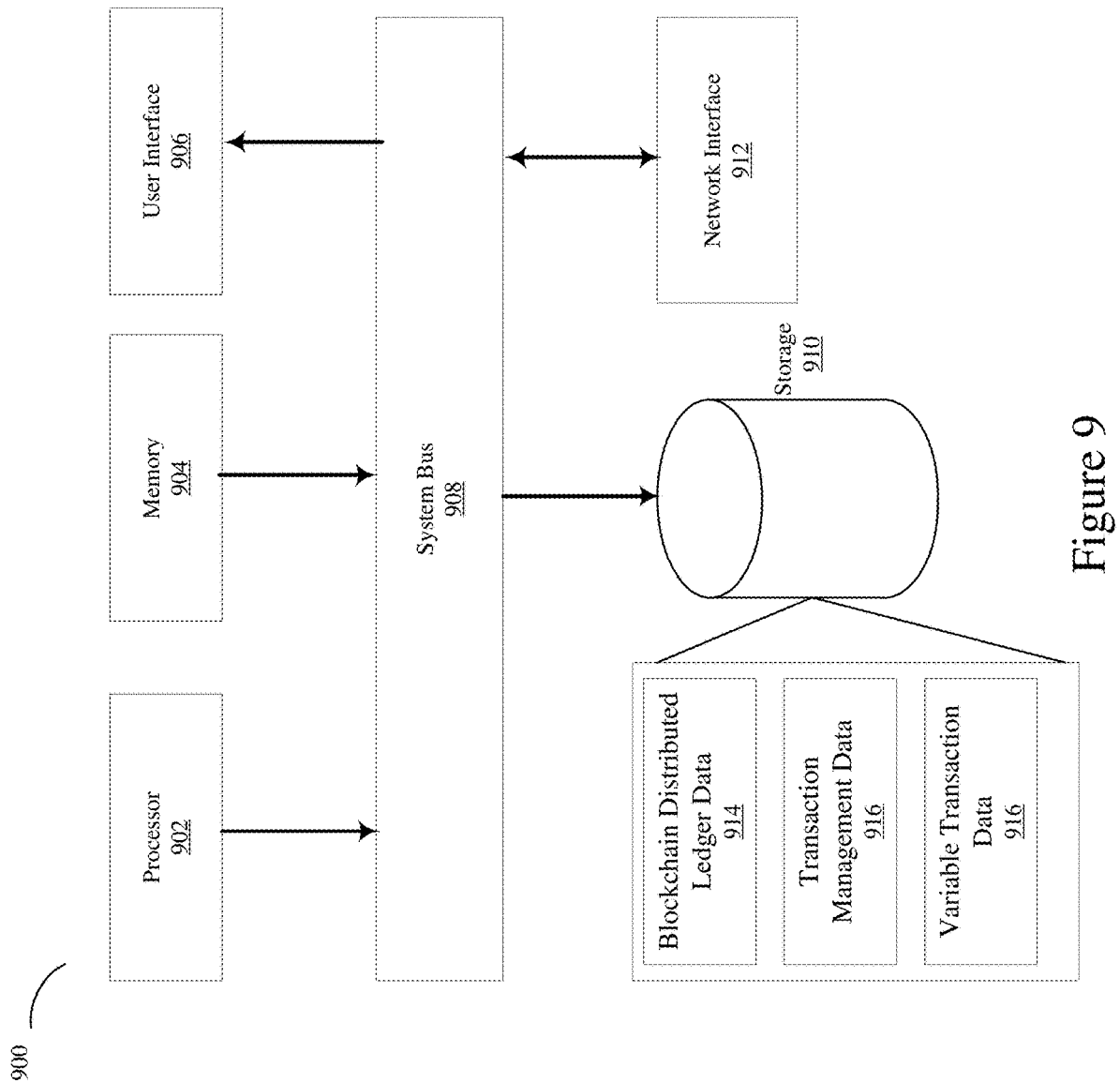
FIG. 9 is a block diagram of a server system in accordance with some implementations.

FIG. 9 is a block diagram of a server system 900 in accordance with some implementations. The server system 900 may correspond to one or more BDL servers and/or the foundation server 106. For example, server system 900 may be a node on BDLN 104, or blockchain management server 103 as well. As shown, the server system 900 includes processor 902, memory 904, user interface 906, storage 910 and network interface 912 interconnected via one or more system buses 908.

Processor 902 may be any hardware device capable of executing instructions stored in memory 904 or storage 910, or otherwise processing data. As such, processor 902 may include a microprocessor, one or more field programmable gate array(s) (FPGA), application-specific integrated circuit (ASIC), GPUs or other similar devices.

Memory 904 may include any of various memory types such as L1, L2, L3 cache or system memory. As such, memory 904 may include static random-access memory (SRAM), dynamic RAM (DRAM), flash memory, solid state device (SSD), read only memory (ROM), or other similar devices.

User interface 906 may include one or more devices for enabling communication with a user such as a foundation server 106 administrator. For example, user interface 906 may include a display, a mouse, and a keyboard for receiving user commands. In some embodiments, the user interface may include a command line interface or graphical user interface that may be presented to another or remote terminal via the network interface. For example, user interface 906 may be presented to user device 102 and/or blockchain management server 103.

Network interface 912 may include one or more devices for enabling communication with other hardware devices. For example, network interface 912 may include a network interface card (NIC) configured to communicate according to the Ethernet protocol. Additionally, the network interface may implement a TCP/IP stack for communication according to the TCP/IP protocols. A 4G/5G/LTE, Wifi, or any other wireless protocol may similarly be used. Various alternative or additional hardware or configurations for the network interface will be apparent to one of skill in the art.

The storage 910 may include one or more machine readable storage media such as read only memory (ROM), random access memory (RAM), Solid State Drive (SSD), magnetic disk storage media, optical storage media, flash memory devices, etc. In various embodiments, the storage 910 may store instructions for execution by the processor or data upon which the processor may operate. For example, the storage may store all or part of blockchain distributed ledger data 914 and its various blocks and transactions. In other embodiments storage 510 may store transaction management data 916 including a list of all transactions for all foundation and/or restricted transactions that have taken place. In yet further embodiments, storage 510 may store variable transaction data 916 including data specific to institutions intended to benefit from the split transactions discussed above.

It will be apparent to one in the art that various information described as stored in the storage may be additionally or alternatively stored in the memory. All memory and storage may include non-transitory machine-readable instructions. Both the storage and memory may be considered non-transitory machine-readable media.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

In some embodiments all or part of server system 900 may be implemented as virtual functions. For example, Amazon Web Services, Google App Engine, Microsoft Azure, systems or functions may be used for all or part of the services and embodiments described herein. Further, one or more virtual machines running on shared hardware may be used to implement all or part of the methods described. Network Functions Virtualization (NFV) on Software Defined Networks (SDN) and their methods may also be used for all of part of the systems and embodiments described. For example, in some embodiments, foundation server 106, BDLN 104 or blockchain management server 103 may act as a NFV Orchestrator and provide resource orchestration between components or nodes. A hypervisor, for example, may be used to run all or part of the virtual machines as necessary.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method comprising:

receiving a transaction request on a first distributed ledger transaction machine of a plurality of distributed ledger transaction machines, which are part of a distributed ledger network, each storing an identical copy of a blockchain;

extracting percentage allocations for each transaction in the transaction request as well as a set of identifying information indicating an owner for at least one of the transactions;

recording a first transaction extracted from the transaction request in a block on the blockchain, on the first distributed ledger transaction machine according to a first percentage allocation from the extracted percentage allocations, where the first transaction can be freely exchanged and transferred on the distributed ledger network and is unmarked;

recording a second transaction on the block on the first distributed ledger transaction machine according to a second percentage allocation from the extracted percentage allocations, including restricting the second transaction via a marking in the second transaction's data where the marking enables a centralized machine to control access and use of the second transaction, which is not controlled by the distributed ledger network;

transmitting an identifier for the second transaction to the centralized machine for storage and management;

identifying, by the centralized machine, the second transaction as restricted on the distributed ledger network according to the identifier for the second transaction;

receiving, by the centralized machine, a release request from one or more entities;

identifying, by the centralized machine, the second transaction as a transaction to be released, wherein the identification of the second transaction as the transaction to be released is based on the release request;

storing, by the centralized machine, the second transaction as the transaction to be released;

transmitting, by the centralized machine, the release request to the first distributed ledger transaction machine, in response to identifying the second transaction as the transaction to be released; and processing, by the first distributed ledger transaction machine, the release request.

2. The method of claim 1, where the second transaction is added to a controlled ledger on the centralized machine, by the centralized machine.

3. The method of claim 2, where the identifier for the second transaction is a hash associated with the second transaction and is stored in the controlled ledger to identify the second transaction.

4. The method of claim 3, wherein the marking is a data field logged as part of the second transaction recording on the block and indicates to the distributed ledger network that the second transaction cannot be used.

5. The method of claim 1, where a total of the first and second percentage allocation is equal to one.

6. The method of claim 1, where the marking is a data field logged as part of the second transaction recording on the block.

7. The method of claim 1, where the set of identifying information includes the exact legal name of a charitable institution and associated tax identifier of the owner.

8. The method of claim 1, wherein the transmitted identifier is a hash of the second transaction and the set of identifying information includes at least one of the owner's mailing address, website address, annual tax period, customer receipt number, a customer receipt number, an Automated Clearing House confirmation number, a donor identification, or identification of contribution amount.

9. A system comprising:
a first distributed ledger transaction machine that comprises:
a processor; and
a memory coupled to the processor configured to:
receive a transaction request on the first distributed ledger transaction machine of a plurality of distributed ledger transaction machines, which are part of a distributed ledger network, each storing an identical copy of a blockchain;
extract percentage allocations for each transaction in the transaction request as well as a set of identifying information indicating an owner for at least one of the transactions;
record a first transaction extracted from the transaction request in a block on the blockchain, on the first distributed ledger transaction machine according to a first percentage allocation from the extracted percentage allocations, where the first transaction can be freely exchanged and transferred on the distributed ledger network and is unmarked;
record a second transaction on the block on the first distributed ledger transaction machine according to a second percentage allocation from the extracted percentage allocations, including restricting the second transaction via a marking in the second transaction's data where the marking enables a centralized machine to control access and use of the second transaction, which is not controlled by the distributed ledger network; and
transmit an identifier for the second transaction to the centralized machine for storage and management;
receive a release request;
process the release request;
the centralized machine, the centralized machine comprising:
a centralized machine processor; and a centralized machine memory that stores second computer readable instructions that when executed by the centralized machine processor to perform the operations of:
identifying the second transaction as restricted on the distributed ledger network according to the identifier for the second transaction;
receiving the release request from one or more entities;
identifying the second transaction as a transaction to be released, wherein the identification of the second transaction as the transaction to be released is based on the release request;
storing the second transaction as the transaction to be released; and
transmitting the release request to the first distributed ledger transaction machine, in response to identifying the second transaction as the transaction to be released.

10. The system of claim 9, where the identifier for the second transaction is a hash associated with the second transaction and is stored in a controlled ledger on the centralized machine to identify the second transaction.

11. The system of claim 10, wherein the marking is a data field logged as part of the second transaction recording on the block and indicates to the distributed ledger network that the second transaction cannot be used.

12. The system of claim 9, where a total of the first and second percentage allocation is equal to one.

13. The system of claim 9, where the marking is a data field logged as part of the second transaction recording on the block.

14. The system of claim 9, where the set of identifying information includes the exact legal name of a charitable institution and associated tax identifier of the owner.

15. The system of claim 9, wherein the transmitted identifier is a hash of the second transaction and the set of identifying information includes at least one of the owner's mailing address, website address, annual tax period, customer receipt number, a customer receipt number, an Automated Clearing House confirmation number, a donor identification, or identification of contribution amount.

* * * * *